United States Patent Office 2,950,243
Patented Aug. 23, 1960

2,950,243

PLATINUM-ALUMINA CATALYSTS AND THEIR USE

Harry M. Brennan, Hammond, Ind., and Edmund Field, Chicago, Ill., assignors to Standard Oil Company, Chicago, Ill., a corporation of Indiana No Drawing. Filed Nov. 30, 1955, Ser. No. 560,275

5 Claims. (Cl. 208—138)

This invention relates to the conversion of hydrocarbons and to an improved catalyst therefor. More particularly, it relates to an improved alumina-supported platinum catalyst and to the catalytic hydroforming of petroleum naphthas therewith.

The use of platinum-group metal catalysts is now well-established in the art, where they have been employed for many diverse processes, such as the hydrogenation of carbonyl groups and unsaturated carbon-carbon linkages, dehydrogenation of naphthenes, oxidation of sulfur dioxide, and the like. An especially successful development of recent years has been the use of alumina-supported platinum catalysts for hydroforming petroleum naphthas, whereby gasoline products are obtained having greatly improved antiknock ratings. An object of our invention is to improve the conversion of hydrocarbons with such catalysts, and particularly to improve the hydroforming of petroleum naphthas with platinum-alumina catalysts. Another object is to produce an alumina-supported platinum catalyst of improved activity. A further object is to produce a platinum-alumina catalyst of satisfactory activity having a lower concentration of platinum than the prior-art catalysts. These and other objects of our invention will be apparent from the following description thereof.

We have earlier discovered, in collaboration with Roy W. Vander Haar, a new form of alumina, having improved properties as a support for platinum catalysts, prepared by "alkali-aging" peptized alumina at a pH between about 8.5 and 12, and thereafter drying to a volatiles content less than about 50 percent, wet basis, prior to incorporation of platinum therein. This technique is applicable broadly to alumina hydrosols or other forms of hydrous alumina which have been subjected to some degree of peptization (i.e., conversion to the colloidal alumina form) by treatment with a weak acid.

We have now discovered an improvement in the said "alkali-aging" technique, which improvement comprises including a water-soluble oxygen-containing organic solvent in the treating mixture during the alkali-aging step —i.e., solvents which are soluble in water to the extent of at least about 5 percent by volume. Best results are obtainable with water-miscible solvents, in particular the water-miscible aliphatic alcohols (i.e., methanol, ethanol, isopropyl alcohol, n-propyl alcohol, and tert-butyl alcohol). Other suitable solvents include acetone, dioxane, ethylene glycol, propylene glycol, ethylene glycol monoethyl ether, ethylene glycol diethyl ether, diethylene glycol diethylether, tetrahydrofurfuryl alcohol, and the like. These materials may be used in a wide range of concentrations with advantageous results, for example between about 5 and 95 percent by volume of the liquid content of the treating bath, and we prefer to use between 10 and 50 volume percent. The solvent can readily be recovered from the liquid phase remaining after the alkali-aging has been completed. A principal advantage in the addition of organic solvents lies in the accelerated formation of two maxima in the pore-size distribution of the alumina, with consequent improvement in the properties of the catalysts based thereon.

Alumina hydrosols can be prepared by a number of methods, such as by hydrolyzing aluminum acetate or an aluminum alkoxide in an aqueous medium under controlled conditions, digesting hydrous alumina in dilute acid, and the like. Alumina hydrosols are most conveniently prepared, however, by the technique described in Heard Re. 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 210° F. Thick viscous hydrosols can be obtained at temperatures above 160° F., while relatively thin hydrosols are obtained at temperatures below 160° F. The mixture of amalgamated aluminum and acidulated water is preferably agitated in order to improve the contact of the reacting materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrosol product is a syrupy liquid of opalescent, nearly transparent appearance, containing from around 2 to 10 percent by weight of $Al_2O_3$.

Another form of peptized lumina suitable for use as the starting material in our invention can be prepared by a modification of the Heard technique, omitting the weak organic acid peptizing agent in the digestion of the amalgamated aluminum, so that a slurry of hydrous alumina is obtained, separating the hydrous alumina, and thereafter digesting the hydrous alumina with acetic acid or other weak organic acid to peptize the alumina. The resulting suspension or slurry can be treated according to our process to prepare an improved platinum-alumina catalyst.

In one embodiment of our invention, a Heard-type alumina hydrosol is commingled with an equal volume of a water-miscible aliphatic alcohol, preferably methanol, and a quantity of an alkaline substance, preferably ammonia or ammonium hydroxide, sufficient to raise the pH of the mixture above about 8.5, but insufficient to convert any considerable proportion of the alumina into an aluminate salt. We ordinarily operate at a pH no higher than the maximum level obtainable by adding ammonia to the system under pressure (i.e., below about pH 12), and we prefer to operate in the range of about pH 10 to 11. The alkalized hydrosol is aged for about one hour or more at about 50 to 250° F., preferably at ordinary temperatures around 70 to 100° F. for 24 hours or more, and optimally for around 2 to 7 days, the shorter aging periods corresponding generally to the higher pH levels and (in lesser degree) to the higher temperatures. During this operation, white, finely divided hydrous alumina forms in the liquid phase as a filterable slurry, the reaction being ordinarily complete in as little as one hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to ensure a rapid filtration rate. The filtrate may be recycled in part, if desired, to treat additional alumina hydrosol, or it may be withdrawn wholly or in part to recover the organic solvent and the alkaline substance remaining therein by means known to the art. The filter cake is dried at ordinary or elevated temperatures up to about 1200° F., preferably between about 150 and 400° F., to a volatiles content less than about 50 percent, wet basis, preferably between about 15 and 40 percent.

The dried cake is thereafter impregnated with a platinum-containing solution according to any of the techniques of the prior art to a platinum level between about 0.05 and 1 percent by weight, based on dry $Al_2O_3$. For this purpose, we find it especially advantageous to employ an aqueous chloroplatinic acid solution in a quantity just sufficient to saturate the alumina powder, and to adjust the concentration of platinum in the solution to produce a completed catalyst of the desired platinum content. Thereafter, an ammonium sulfide solution is added in an S:Pt atomic ratio between about 1 and 10 to effect uniform distribution of the platinum in and on the alumina. The impregnated alumina is again dried, pelleted if desired, and finally calcined in air, hydrogen, or an inert gas such as nitrogen or flue gas at 800 to 1200° F., preferably 1000 to 1200° F., for around 3 to 24 hours before being placed on stream in a catalytic process.

Ammonia or ammonium hydroxide is a highly advantageous material for use as the alkalizing agent in our process. Other nitrogen bases can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethylammonium hydroxide, and the like. Inorganic bases and alkalies such as sodium hydroxide, sodium carbonate, potassium carbonate, calcium hydroxide, and the like may also be employed in quantities carefully limited to avoid excessively high pH levels; but after such materials are used, it is generally desirable to wash the alkali-aged alumina thoroughly to remove the alkali cations therefrom before drying and impregnating with platinum. In all cases, the alkalizing agent must have an ionization constant sufficiently high to permit it to raise the peptized alumina mixture to a pH above about 8.5, and must be used in a sufficient quantity to reach the desired pH level, but insufficient to convert any considerable quantity of the alumina into aluminate salts. On this basis, a pH of around 11.5 is the practical maximum which we ordinarily choose to employ, and can be produced, for example, by adding about two volumes of aqueous 29 percent ammonium hydroxide to one volume of Heard-type alumina hydrosol. In commingling the alumina with the alkalizing agent, it is desirable to employ rapid agitation, dilution, controlled rate of addition, multiple-point addition, and other expedients known to the art to avoid or to minimize effects of localized overtreatment.

In order to obtain highly active catalysts from alkali-aged alumina, it is important to dry the alkali-aged alumina prior to impregnation with platinum. According to our experience, it is sufficient to dry the alumina to a volatiles content below about 50 percent by weight, wet basis, prior to platinum impregnation, the alumina being converted thereby into a precursor of eta-alumina. The drying is suitably carried out at ordinary or elevated temperatures up to about 400° F., preferably between about 150 and 400° F., and preferably to a volatiles content between about 15 and 40 percent. A drying time of about 1 to 24 hours is ordinarily sufficient, and under favorable conditions a near approach to the equilibrium volatiles content at most temperatures can be achieved in the average. The approximate equilibrium or near-equilibrium volatiles content of the alumina cake at a series of drying temperatures is set forth in the following table:

| Drying Temperature, ° F. | Ratio, $H_2O:Al_2O_3$, molar | Volatiles Content, wet basis, wt.-percent |
|---|---|---|
| 220 | 3 | 34.6 |
| 300 | 2.8 | 33.1 |
| 400 | 1 | 15 |

The resulting dried cake, unlike most aluminas known to the prior art, can be pelleted immediately if desired, without a preliminary calcination at high temperature, requiring only pulverization and the addition of a lubricant of the usual sort, such as 4 percent of Sterotex. The dried alumina, before or after being pelleted, but preferably after being impregnated with platinum, is readily converted wholly or in part into eta-alumina by the simple device of further drying at higher temperatures, suitably between about 500 and 1200° F. for a period of 1 to 24 hours or more, and preferably between about 800 and 1200° F. for a period of around 6 to 12 hours, or to a volatiles content approximating the equilibrium level at the temperature employed, as illustrated in the following table:

| Drying Temperature, ° F. | Ratio, $H_2O:Al_2O_3$, molar | Volatiles Content, wet basis, wt.-percent |
|---|---|---|
| 600 | 0.45 | 7.4 |
| 650 | 0.4 | 6.6 |
| 900 | 0.06 | 1 |

Where the dried alumina has been subjected to pelleting before being converted to eta-alumina, the said conversion is preferably carried out at 1000 to 1200° F. in order to produce completed pellets of highest mechanical strength. The completed alumina, we have found, contains a substantial proportion of eta-alumina, ordinarily 5 percent or more, as indicated by the X-ray diffraction pattern thereof, and may contain approaching 100 percent eta-alumina, depending upon the duration, pH, and temperature of the aging period, and the duration and temperature of the heating periods.

It will be apparent that a preliminary drying to form eta-alumina precursor and a further heat-treatment to form eta-alumina may be carried out in an uninterrupted operation if desired at progressively rising temperature, although we prefer to effect platinum impregnation between the two stages. Alternatively, the entire drying and heat-treating operation may be carried out in a treating zone nominally maintained at a temperature within the range required for the production of eta-alumina (i.e., from about 500 to 1200° F.). In this modification, the preliminary drying is carried out rapidly at rising temperature during evolution of the volatiles, and the period of conversion to eta-alumina follows immediately without interruption.

Our new catalyst can be prepared in any of the usual mechanical forms. It can be ground to a powder for use in fluidized form. It can be broken into irregular fragments. It can be prepared in various shapes, such as pills, pellets, rings, rosettes, saddles, and the like as desired. In the preparation of shaped catalysts, as pointed out hereinabove, our alumina base does not require a preliminary calcination; instead, the dried cake can be pulverized, mixed with a lubricant, and formed directly into shapes; and only thereafter is calcination employed to effect formation of eta-alumina and to set and strengthen the mechanical structure of the shaped material. In most cases, the final conditioning of the catalyst composition, whether pelleted or not, is carried out by calcination in air, hydrogen, or an inert gas at about 1000 to 1200° F. for around 3 to 24 hours before being placed on stream.

"Eta-alumina," as the term is employed herein, refers to a form of alumina of the type defined by Allen S. Russell in his brochure entitled "Alumina Properties," Technical Paper No. 10, copyright 1953, Aluminum Company of America, page 17. In one prior-art method for the preparation of eta-alumina, beta-alumina trihydrate is dried at 284 to 464° F. to an alpha-alumina monohydrate, and the alpha-alumina monohydrate is further heated at 482 to 842° F. The resulting composition is largely eta-alumina, which closely resembles gamma-alumina and is distinguishable therefrom in physical properties only by slight differences in their x-ray diffraction patterns (Stumpf, Russell, Newsome, and Tucker, Ind. Eng. Chem 42 (1950), 1398–1403). Moreover, it is commonly found that such compositions contain a substantial proportion of gamma-alumina, which, however, is without adverse catalytic effects. Our alumina, after calcination under the conditions described above, contains 5 percent or more of eta-alumina, but differs from the prior-art eta-alumina compositions in some unascertained way, as a result of which it affords platinum-alumina catalysts of strikingly superior activity.

The following specific example will more clearly illustrate the technique and advantages of our invention.

Three liters of concentrated aqueous ammonium hydroxide solution were combined with 300 milliliters of ethanol, and the mixture was commingled with four liters of a Heard-type alumina hydrosol containing 5 percent by weight of $Al_2O_3$. The total mixture was allowed to stand over night at room temperature, during which time the alumina was converted into a slurry of solid particles. At the end of this time, the slurry was filtered, and the cake was dried over night at 220° F. The dried cake was crushed to pass a 30-mesh screen, then commingled with an aqueous chloroplatinic acid solution in a quantity equivalent to 0.6 percent by weight of platinum, based on dry $Al_2O_3$, and containing ammonium sulfide in a 1:1 S:Pt ratio. The mixture was dried over night at 220° F., crushed, lubricated with 4 percent by weight of Sterotex, formed into ⅛" x ⅛" pellets, and calcined at 1000° F. for 6 hours.

For comparison, an impregnated platinum-alumina catalyst of a conventional type was prepared by drying a Heard-type alumina hydrosol at 200° F. for 18 hours to a volatiles content of approximately 35 percent by weight, wet basis, then impregnating to a level of 0.6 percent by weight of platinum, based on dry $Al_2O_3$, according to the impregnation technique described above.

The completed catalysts were subjected to a hydroforming activity test under standardized conditions, employing 50 milliliters of catalyst in a quasi-isothermal reaction zone surrounded by an electrically heated block for temperature control. The tests were carried out at a catalysts outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having an ASTM distillation range of 210 to 356° F., a CFR–R octane number of 44.0, an API gravity of 55.2°, a Reid vapor pressure of 1.1 pounds per square inch, and a composition consisting of 50.0 percent by volume of paraffins, a trace of olefins, 41.5 percent naphthenes, 8.5 percent aromatics, 0.028 percent sulfur, and 0.01 percent nitrogen (Kjeldahl). The catalyst activity was calculated as the relative quantity, expressed as a percentage, of an arbitrarily chosen standard catalyst required to produce a $C_5+$ product fraction having the same octane number under the same test conditions.

Comparative results of the hydroforming activity tests indicate that our new catalyst is greatly superior in activity:

| Product Interval, hr. | Solvent, Alkali Treated Catalyst | | Conventional Catalyst | |
|---|---|---|---|---|
| | Product Octane, CFR–R | Relative Activity | Product Octane, CFR–R | Relative Activity |
| 0–20 | 99.2 | 170 | 94.0 | 72 |
| 20–40 | 97.9 | 136 | 94.5 | 79 |
| 40–60 | 97.1 | 118 | 93.4 | 69 |
| 60–80 | 96.3 | 101 | 92.3 | 60 |
| 80–100 | 95.7 | 92 | 92.6 | 66 |
| 100–120 | 95.5 | 89 | 93.5 | 73 |
| 120–140 | 95.0 | 83 | | |
| 140–160 | 94.5 | 76 | | |
| 160–180 | 93.3 | 66 | | |

Our improved catalysts are broadly useful in hydrocarbon-conversion reactions which are catalyzed by platinum. Specifically, our catalysts are useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. Our catalysts are especially advantageous in the hydoforming of petroleum naphthas boiling in the range of about 200–400° F., and are capable of upgrading a 50 percent naphthenic naphtha having a CFR–R octane number of only 40 to 50 into a $C_5+$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, we claim as our invention:

1. A method for preparing a catalyst consisting essentially of alumina and platinum which comprises forming a mixture by commingling an alumina hydrosol with a solution consisting essentially of water, an alkaline substance selected from the class consisting of ammonium hydroxide, water-soluble amines, and water-soluble quaternary ammonium hydroxides, and a water-miscible oxygen-containing organic solvent selected from the class consisting of an alkyl alcohol, acetone, an alkyl glycol and an alkyl ether, said alkaline substance being employed in a quantity sufficient to adjust the pH of the commingled mixture to a level within the range of about 8.5 to 12, and said solvent being employed in a proportion between about 10 and 50 percent by volume of said mixture, maintaining the resulting mixture at a pH within said range and a temperature between about 50 and 250° F. for a period in excess of about one hour, whereby the alumina contained therein is converted into a filterable slurry of solid, hydrous alumina, separating said solid, hydrous alumina from said slurry, drying the separated alumina to a volatiles content between about 15 and 50 percent, wet basis, impregnating the dried alumina with an aqueous chloroplatinum acid solution to a platinum level between about 0.05 and 1 percent by weight, based on dry $Al_2O_3$, and drying and calcining.

2. A catalyst consisting essentially of alumina and platinum prepared by forming a mixture by commingling an alumina hydrosol with a solution consisting essentially of water, an alkaline substance selected from the class consisting of ammonium hydroxide, water-soluble amines, and water-soluble quaternary ammonium hydroxides, and a water-miscible oxygen-containing organic solvent selected from the class consisting of an alkyl alcohol, acetone, an alkyl glycol and an alkyl ether, said alkaline substance being employed in a quantity sufficient to adjust the pH of the commingled mixture to a level within the range of about 8.5 to 12, and said solvent being employed in a proportion between about 10 and 50 percent by volume of said mixture, maintaining the resulting mixture at a pH within said range and a temperature between about 50 and 250° F. for a period in excess of about one hour, whereby the alumina contained therein is converted into a filterable slurry of solid, hydrous alumina, separating said solid, hydrous alumina from said slurry, drying the separated alumina to a volatiles content between about 15 and 50 percent, wet basis, impregnating the dried alumina with an aqueous chloroplatinum acid solution to a platinum level between about 0.05 to 1 percent by weight, based on dry $Al_2O_3$, and drying and calcining.

3. A hydroforming process wherein a petroleum naphtha is contacted under hydroforming conditions with a catalyst consisting essentially of alumina and platinum prepared by forming a mixture by commingling an alumina hydrosol with a solution consisting essentially of water, an alkaline substance selected from the class consisting of ammonium hydroxide, water-soluble amines, and water-soluble quaternary ammonium hydroxides, and a water-miscible oxygen-containing organic solvent selected from the class consisting of an alkyl alcohol, acetone, an alkyl glycol and an alkyl ether, said alkaline substance being employed in a quantity sufficient to adjust the pH of the commingled mixture to a level within the range of about 8.5 to 12, and said solvent being employed in a proportion between about 10 and 50 percent by volume of said mixture, maintaining the resulting mixture at a pH within said range and a temperature between about 50 and 250° F. for a period in excess of about one hour, whereby the alumina contained therein is converted into a filterable slurry of solid, hydrous alumina, separating said solid, hydrous alumina from said slurry, drying the separated alumina to a volatiles content between about 15 and 50 percent, wet basis, impregnating the dried alumina with an aqueous chloroplatinum acid solution to a platinum level between about 0.05 and 1 percent by weight, based on dry $Al_2O_3$, and drying and calcining.

4. In the method of preparing a catalyst consisting essentially of alumina and platinum, which method comprises forming a mixture by commingling an alumina hydrosol with an aqueous solution of an alkaline substance selected from the class consisting of ammonium hydroxide, water-soluble amines, and water-soluble quaternary ammonium hydroxides, said alkaline substance being employed in a quantity sufficient to adjust the pH of the commingled mixture to a level within the range of about 8.5 to 12, maintaining the resulting mixture at a pH within said range and at a temperature between about 50 and 250° F. for a period in excess of about one hour, whereby the alumina contained therein is converted into a filterable slurry of solid, hydrous alumina, separating said solid, hydrous alumina from said slurry, drying the separated alumina to a volatiles content between about 15 and 50 percent, wet basis, impregnating the dried alumina with an aqueous chloroplatinum acid solution to a platinum level between about 0.05 and 1 percent by weight, based on dry $Al_2O_3$, and drying and calcining, the improvement which consists of commingling said alumina hydrosol with said aqueous solution of said alkaline substance in the presence of a water-miscible oxygen-containing organic solvent selected from the class consisting of an alkyl alcohol, acetone, an alkyl glycol and an alkyl ether, said solvent being employed in proportions between about 10 and 50 percent by volume of said mixture.

5. An improved catalyst prepared by the method of claim 4.

References Cited in the file of this patent

UNITED STATES PATENTS

| | | |
|---|---|---|
| 2,658,028 | Haensel et al. | Nov. 3, 1953 |
| 2,734,022 | Kimberlin et al. | Feb. 7, 1956 |
| 2,787,522 | Le Francois | Apr. 2, 1957 |
| 2,818,393 | Le Francois et al. | Dec. 31, 1957 |